UNITED STATES PATENT OFFICE.

LÉON CUISINIER, OF PARIS, FRANCE.

LIQUEFACTION, DEXTRINATION, AND SACCHARIFICATION BY MEANS OF MALT OF THE STARCH IN AMYLACEOUS SUBSTANCES.

SPECIFICATION forming part of Letters Patent No. 311,646, dated February 3, 1885.

Application filed December 18, 1884. (No specimens.) Patented in England October 22, 1884, No. 14,011.

*To all whom it may concern:*

Be it known that I, LÉON CUISINIER, a citizen of the French Republic, and a resident of Paris, France, have invented certain Improvements in the Extraction and the Liquefaction, Dextrination, and Saccharification by means of Malt of the Starch in Amylaceous Substances, for use in brewing, distilling, and the manufacture of confectionery, chocolate, &c., of which the following is a specification.

The generic name of "malt" is given to germinated amylaceous grains—such as barley, rye, maize, rice, and wheat—which during germination develop an active principle which has the effect to liquefy, dextrinate, and saccharify comparatively large quantities of starch. This active principle of malt has been called, by Dubrunfaut notably, "maltine."

Malt has two distinct effects when mixed with starch: First, it liquefies and dextrinates the starch; second, it saccharifies the dextrine. The liquefying action of malt increases as the temperature rises from 50° to 75° centigrade; but the saccharifying action, on the contrary, decreases as the temperature rises from 50° to 75° centigrade. The malt loses at once all its activity when the temperature of the wort containing it is raised to 80° centigrade, and it preserves its activity the better in proportion as the temperature given above is lower.

The active principle of malt may be extracted by grinding, washing in water, and straining. The infusion thus obtained has all properties of malt, is subject to acid alterations, and should be kept in a cool place. The washed residues have no action on starch, and may be classed among ordinary amylaceous matters.

The development of acid in the infusion of malt completely annihilates its active properties, and alkalies also have upon it the most pernicious effects.

When an infusion of malt is treated either with alcohol or a very small percentage of tannin, an alcoholate or a tannate, as the case may be, is precipitated, and this precipitate will be found to contain the greater part of the maltine. If it be recovered and dried, it will preserve for some years all the active properties of malt, and may be employed for saccharification.

Having thus set forth the general chemical principles upon which the treatment of amylaceous substances with malt is based, I will now describe my process, after setting forth what I conceive to be its novel features, namely:

First, I employ lime-water in the preparation of the malt, sometimes both before and after germination, in order to secure the infusion of malt against acid alterations.

Second, I employ a temperature in heating the wort that never exceeds the point where the active principle of the malt would be destroyed, whereby I am enabled to obtain in practice worts of very great density, and thus realize an important economy in respect of evaporation.

Third, I manufacture by my process directly very dense sirups and masses of maltose, thus guaranteeing them against acid alterations, which are much less liable to occur in dense than in diluted worts and sirups.

Fourth, I clarify the wort after liquefaction by the malt, whereby I am enabled to draw off directly the greater part of the clear wort.

Fifth, I add the infusion of malt fractionally at intervals during the dextrination, whereby I am enabled to overcome the defect arising from the loss of dextrinating power of the malt due to prolonged subjection to heat when added as a whole at the beginning of the operation. By the fractional addition I constantly renew the active power of the malt.

Sixth, I employ paper-pulp in order to facilitate pressing and expression of the liquid from the residues.

The first step in my process is the preparation of the malt and the infusion therefrom. In order to protect the infusion from the acid alterations to which it is subject, I treat the malt with lime-water. This I usually do by soaking the grain previous to germination for about forty hours. After this treatment the grain germinates more vigorously. When the germination has been effected, I wash the malt, before grinding, in lime-water, which destroys all the ferments which the grain has accumulated on its surface during germination. The malt thus treated is now broken up or crushed, this being effected, by preference, with the aid of a pair of smooth crushing-rollers having different diameters. The crushed malt is now triturated with water to form a kind of gruel, which may be effected with the aid of a pair of millstones or an apparatus that is known to French distillers under the name of "Tritureur Depeleur." This gruel of malt is thinned with water to such an extent that ten hectoliters will contain about one hundred kilograms of malt, and then passed through a very fine sieve, rotary preferred, which retains all the hulls of the grain, while the "milk," so called, flows into a vat. The amylaceous matter settles to the bottom, and the clear liquid is drawn off and forms the infusion of malt that I employ. One hectoliter of this infusion represents ten kilograms of malt.

The next step in my process is the preparation of the primary amylacous materials, such as grains, tubers, &c. These amylaceous materials are macerated in cold or tepid water in open tanks or tubs for two or three days. If tubers are employed, they should be previously sliced, for which purpose an ordinary root-cutter may be used. The temperature of the water should not exceed 50° centigrade, and it should be made to circulate through the material. This maceration imparts to the starch in the materials treated certain characteristic properties, and washes out some injurious matters that are soluble. After maceration for two or three days the primary materials will have become sufficiently softened and swelled. The macerated material is now ground, preferably by means of rollers similar to those before described for crushing the malt. After grinding, the ground material is triturated in any suitable machine—as, for example, the apparatus before referred to as a "Tritureur Depeleur." This trituration produces a "gruel" which is well adapted to my after processes. During the process of trituration I add to the amylaceous material from two and one-half to five per cent. of the infusion of malt, in order to effect the liquefaction of the starch, and I thin with water, using the latter in proportions varying with circumstances, as will be hereinafter explained. I now heat the liquid mass, preferably in an ordinary horizontal macerator furnished with an agitator and a steam-jacket for heating; but, whatever means of heating are employed, the temperature should never exceed 75° centigrade. This is of the highest importance, and forms the basis of my process. I prefer, while the process of liquefaction is going on in the macerator, to subject the materials to a process of trituration, in order to detach from the amylaceous material the last traces of starch which may remain adherent to the skins or pellicles after the previous trituration; but this is not essential. The time required to effect the liquefaction varies somewhat with the primary material employed and the state of concentration of the wort. When the liquefaction is prolonged beyond thirty minutes, as is often the case, I do not add the whole of the infusion to the amylaceous material previous to heating in the macerator; but divide it up and add it by degrees or at intervals during the period of liquefaction, whereby I am enabled to avoid that loss of activity in the malt due to prolonged heating up to from 70° to 75° centigrade. The starch liquefies against the hot walls and partitions of the macerator, which have the proper temperature required for liquefaction, and the liquefiant action extends thence to other particles of the starch. When the liquefaction is completed, a test of the wort with iodine shows the red tint indicating the presence of dextrine.

The next step in my process is the separation of the residues from the liquid wort, which is effected by passing the liquefied mass through one or more fine rotary screens or sieves. If the mass is very thick or dense, it may have the liquid portion separated by a centrifugal machine or a press in a well-known way. When the wort is very dense, (15° to 25° Baumé,) I add to the mass, either after the screening or before, about two per cent. of crude paper-pulp, which materially aids the final operation for the removal of the wort from the residues.

Having thus separated the liquefied wort from the residues, the next step in my process is the clarification of the wort. The wort contains soluble substances which may be coagulated by heating, and the air that becomes mixed with the wort in the screening facilitates this; but in some worts these coagulable substances are not in sufficient quantity, and consequently I add to the wort a little fibrine or albumen, and then heat the wort in tanks sufficiently to effect the coagulation. The coagulable matter falls to the bottom, and the clarified wort may be drawn off with a floating siphon or other device for decanting. The clarified wort, if not designed for immediate use in brewing, is drawn off boiling hot and immediately cooled to 70° centigrade, and then from one to two per cent. of the infusion of malt is added to effect the dextrination. The wort is now allowed to stand in the dextrinating-tanks for from two to three hours, in order to convert all traces of starch, and in this operation a slight precipitate is deposited. The clear dextrinated wort is now drawn off, and is ready for saccharification. This dextrinated wort contains about forty per cent. of dextrine and sixty per cent. of maltose. This transformation of the starch only requires about five to ten per cent. of green malt, varying according to the quality of the latter.

The next step in my process is the saccharification, in order to produce very saccharine maltose sirups or masses. To effect this saccharification I bring the temperature of the dextrinated wort to 50° centigrade, and maintain this temperature in the saccharifying-tanks by some suitable heating apparatus—as, for example, coils of pipe through which hot water at the above temperature is caused to flow. To the wort I add the infusion of malt alone, or diluted with from ten to twenty per cent. of water, according to the extent of saccharification I wish to obtain, and allow it to stand for ten hours or more. The progress of the saccharification may be ascertained by means of a saccharometer or with cupric liquor. When the proper degree of saccharification is reached, the wort is filtered mechanically, and then reheated to 100° centigrade, if it be desired to filter through coarse bone-black to decolorize it. To produce crystal sirups or masses, the saccharified wort is now concentrated *in vacuo* to a density of 38° Baumé. This dense sirup is allowed to flow into casks or molds. In the preparation of maltose in masses a bait of a little maltose should be used.

By my process above described I am enabled to perfectly and completely saccharify worts as dense as 10° to 25° Baumé, and to produce by saccharification maltose in masses at these higher densities. These dense worts being less liable to acid alterations than the more diluted worts, I am enabled to reach a high degree of perfection in the saccharification.

The insoluble matter from the materials treated by my process consists, principally, of cellulose, pectic bodies, and indeterminate azotized matters. The cellulose forms an almost indispensable filtering element, which it is necessary to respect during the grinding. The soluble matters, aside from the starch, comprise certain azotized matters soluble only with heat by the aid of the malt, mainly salts and a little dextrine and glucose. In tubers these matters have a disagreeable taste.

Before the maceration of amylaceous substances which already show a tendency to alteration, they should be washed with or soaked in lime-water for some hours in order to arrest this tendency.

For the liquefaction of the starch I may use the crushed malt itself in lieu of the infusion as described; but the latter is preferred.

By the maceration, grinding, and triturating of amylaceous substances as herein described, nearly the whole of the starch contained therein should be soluble at 70° to 75° centigrade when subjected to the action of the malt. That portion which is not dissolved under these conditions is only soluble in water heated in a closed vessel up to 150° centigrade. The starch dissolved in water at this temperature is precipitated anew if the temperature of the liquid be lowered to 70° centigrade; but the addition of a little of the infusion of malt wholly prevents this precipitation, and the starch is liquefied by cooking.

Liquefaction or dextrination of starch by malt is the transformation of the starch into dextrine by the malt at from 70° to 75° centigrade. This liquefaction is definitive. Saccharification is the maceration of dextrinated worts with the infusion of malt at a temperature lower than 70° centigrade. The saccharification reaches its maximum of intensity at from 40° to 50° centigrade. To arrest the saccharification it is only necessary to raise the temperature of the wort to 100° centigrade. The saccharification produces, according to its duration, a variable mixture of dextrine and maltose. The dextrine is not fermentable. The maltose is a glucose having a sugary flavor, of which the formula is $C_{12}H_{11}O_{11}$. It is fermentable, and constitutes the sugar of beer-worts.

Being able to arrest the saccharification in an instant, I am able to produce in my worts variable properties of dextrine and maltose, and am thus able to produce at will, notably, any variety of beer-worts desired. For the manufacture of these beer-worts I prefer to employ those grains which will impart to the wort, besides the dextrine and sugar, those saline and azotized elements that characterize true beer. For the manufacture of pure maltose sirups or dextrine it is best to employ those amylaceous materials which are very rich in pure starch—as rice, for example. The water employed in the manufacture should be as pure as possible. If it contains the alkaline bicarbonates, these should be neutralized by some mineral acid.

I have said that the triturated amylaceous matter is to be thinned with water before liquefaction, and that the proportions of water would vary with the density of the wort one desired to obtain. I will explain this. For the manufacture of sirups it is desirable, in order to economize in the evaporation, to make the worts very dense—up to 15° to 25° Baumé, for example. On the contrary, in preparing worts for immediate use in brewing and distilling, the quantity of water added should be sufficient to reduce the wort, after dextrination, to 4° to 15° Baumé. Where the object is to produce dense sugar masses it is necessary to employ only the infusion of malt, and not the triturated malt itself.

In countries where the laws relating to distilling require the product from each tub to be given as soon as the liquefaction is terminated, the wort should be cooled to 50° centigrade, clarified, and then saccharified by the addition of the infusion of malt. The saccharification requires two hours or more, when the wort is cooled to 25° centigrade, and the yeast put in. The saccharification is then continued during the fermentation.

After the clarification of the liquefied wort I thin the residues with water and cook it in a closed macerator provided with a mechanical agitator and heated by steam. The temperature is raised to 150° centigrade, and the cooking is continued for thirty minutes or more. The amount of water added should be sufficient to impart a density of 4° Baumé to the juice or liquor. The mass is cooled in the macerator to 70° centigrade, and from one to two per cent. of the infusion of malt is added to provoke dextrination of the starch liquefied by the cooking. This dextrination is effected almost instantaneously. The mass is now passed over a sieve or screen, and then the residues are pressed in a hydraulic press. These residues are neutral, rich in oils and azotized substances, but wholly free from starch. They form an excellent food for cattle. If pressed into cakes and dried, this substance may be readily transported and preserved for any length of time. The juice or liquor extracted by pressure from the residues I utilize in lieu of water for thinning the triturated amylaceous material before liquefaction. The cooking dissolves a considerable quantity of the azotized matters, which are especially favorable to the manufacture of beer-worts.

If the wort is destined either for direct transformation into beer or concentrated into sirups for use in brewing before the definitive dextrination at 70° centigrade, I heat the wort in a digester under pressure up to about 140° centigrade for some minutes. This cooking is arrested and the wort cooled when it has taken the clear yellow tint of ordinary light or "blonde" beers. The remainder of the process is the same as that heretofore described.

The liquefied worts containing forty per cent. of dextrine, concentrated without further saccharification, furnish excellent sirups for brewing, and for the use of confectioners, makers of chocolate, &c. Clarified with coarse bone-black before concentration, and filtered mechanically either through paper-pulp or sand, they produce limpid crystal sirups incomparable for their appearance and purity. By simply treating them with hops these dextrinated worts, having a density of 4° to 10° Baumé, become true beer-worts, and may be subjected to high or low fermentation.

In some isolated cases one may boil the dextrinated wort with dilute acid, transform it into glucose, and finally treat the latter for the neutralization or recovery of the acids by well-known methods.

When the wort is fermented by the addition of yeast and the fermentation and saccharification are carried on together, the fermentation yields a white, very active yeast, which is easily pressed into cakes for use and sale. This yeast may be used in baking, brewing, and distilling.

My saccharified worts are very useful for sugaring natural and raisin wines.

Having thus described my invention, I claim—

1. The herein-described process for the extraction and the liquefaction, dextrination, and saccharification of starch by malt, which consists in steeping the grain from which the malt is to be made in lime-water, and then germinating the grain and drying it, substantially as set forth.

2. The herein-described process for the extraction and the liquefaction, dextrination, and saccharification of starch by malt, which consists in first malting grain in the usual manner, and then washing or steeping the malt in lime-water in order to destroy any germs of fermentation that may have accumulated on its surface during germination, substantially as described.

3. The herein-described improvement in the manufacture of maltose from amylaceous material, which consists in liquefying the starch in the presence of malt at a nearly uniform temperature of 70° to 75° centigrade, whereby the active principle of the malt is preserved against injury from excessive heat and is enabled to act to the best advantage, and whereby worts of very great density may be produced, substantially as described.

4. The herein-described process for the extraction and the liquefaction, dextrination, and saccharification of starch by malt, which consists in liquefying the starch with malt in the presence of the residues of the amylaceous material, and afterward separating the said residues from the wort, substantially as herein set forth.

5. The herein-described improvement in the manufacture of maltose from amylaceous materials which consists in adding to the triturated mixture of water and amylaceous material while maintained at a temperature of from 70° to 75° centigrade an infusion of malt by degrees, or little by little, at intervals during the liquefaction, whereby the loss of activity of the malt due to prolonged exposure to a high temperature is avoided, substantially as set forth.

6. The herein-described improvement in the manufacture of maltose from amylaceous materials, which consists in mixing paper-pulp with the liquefied starch and the residues of amylaceous materials mingled therewith, and then pressing the mass, whereby the removal of the liquid portion is facilitated, substantially as described.

7. The herein-described improvement in the manufacture of maltose from amylaceous materials wherein a tendency to alteration has already developed, which consists in steeping said materials in lime-water previous to grinding in order to destroy the germ of fermentation therein, substantially as described.

8. The herein-described process for the extraction and the liquefaction, dextrination, and saccharification of starch by malt, which consists in first preparing an infusion of malt substantially as described, then macerating the amylaceous materials in water for two or three days at a temperature not exceeding 50° centigrade, then grinding and triturating said macerated materials, then adding to said triturated materials from two and a half to five per cent. of the infusion of malt, then thinning the mass with water and subjecting it to a temperature of from 70° to 75° centigrade for a sufficient time to effect the liquefaction of the starch, then separating the residues from the mass, substantially as described, then clarifying the expressed wort, substantially as described, then cooling the wort to 70° centigrade and adding from one to two per cent. of the infusion of malt to effect the dextrination, substantially as described, then saccharifying the dextrinated wort at a temperature not exceeding 50° centigrade by the addition thereto of the infusion of malt, substantially as described, and finally concentrating, all substantially as described.

In witness whereof I have hereunto signed my name in the presence of two subscribing witnesses.

LÉON CUISINIER.

Witnesses:
AMAND RITTER,
GEORGES CHAPINS.